March 25, 1924.

1,488,136

H. W. SIMPSON

FENDER AND SAFEGUARD FOR TRACTORS

Original Filed Nov. 7, 1921   2 Sheets-Sheet 1

INVENTOR
Howard W. Simpson
BY his ATTORNEY

Patented Mar. 25, 1924.

1,488,136

UNITED STATES PATENT OFFICE.

HOWARD W. SIMPSON, OF DEARBORN, MICHIGAN, ASSIGNOR TO FORD MOTOR COMPANY, OF DETROIT, MICHIGAN, A CORPORATION OF MICHIGAN.

FENDER AND SAFEGUARD FOR TRACTORS.

Application filed November 7, 1921, Serial No. 513,286. Renewed August 18, 1923.

*To all whom it may concern:*

Be it known that I, HOWARD W. SIMPSON, a citizen of the United States, residing at Dearborn, county of Wayne, State of Michigan, have invented a certain new and useful Improvement in Fenders and Safeguards for Tractors, and declare the following to be a full, clear, and exact description of the same, such as will enable others skilled in the art to which it pertains to make and use the same, reference being had to the accompanying drawings, which form a part of this specification.

This invention relates to fenders and safe guards for tractors, and the object of the invention is to provide a fender and safe guard of a character to provide a housing within which the operator may be seated, the housing preventing dirt, etc., from being thrown onto the operator. The device is particularly adapted for use with a tractor in which the operator is positioned between the two driving wheels, which wheels, by reason of the heavy cleats used, tend to throw earth toward the center of the machine and the fender proper is so designed as to cover a portion of the inner sides of the wheels on each side of the operator and to support a floor on each side of the tractor body providing a housing preventing the operator from accidental injury from the wheels.

With tractors of the type known as the "Fordson" tractor, in which the driving wheels are at the rear of the body of the machine and the forward end of which is supported by steering wheels, there is a tendency for the tractor body to turn about the driving axle whenever the driving wheels become locked from rotation for any cause as for instance the "digging in" of the wheels in the soft ground to a point where the power required to turn the tractor body about the axle is less than that required to rotate the wheels. Considerable danger to the operator results from permitting the tractor body to turn in the manner stated, and an object of this invention is to provide a safeguard in conjunction with a fender structure which, upon the body turning as stated, engages the ground surface to the rear of the driving wheels effectually preventing movement of the vehicle about the axle to a dangerous degree. An additional object of the invention is to provide a comparatively cheap and simple structure of the nature of a fender as heretofore stated and provided with means at the rear of the fenders to engage the ground surface and in conjunction with efficient brace rods or bars capable of withstanding the strain imposed thereupon when the said means is brought into engagement with the ground surface. These objects and the several novel features of the invention are hereinafter more fully described and claimed, and the preferred form of structure embodying my invention is shown in the accompanying drawings in which—

Figure 1:
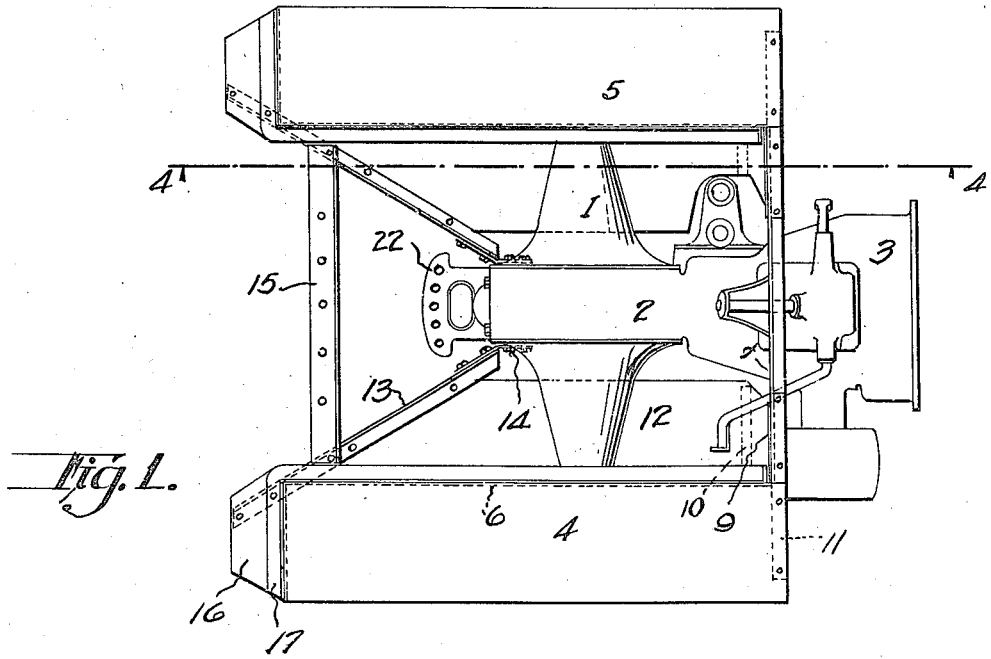
Fig. 1 is a plan view showing a portion of a tractor fitted with my improved form of fender and safe guard.
Figure 2:
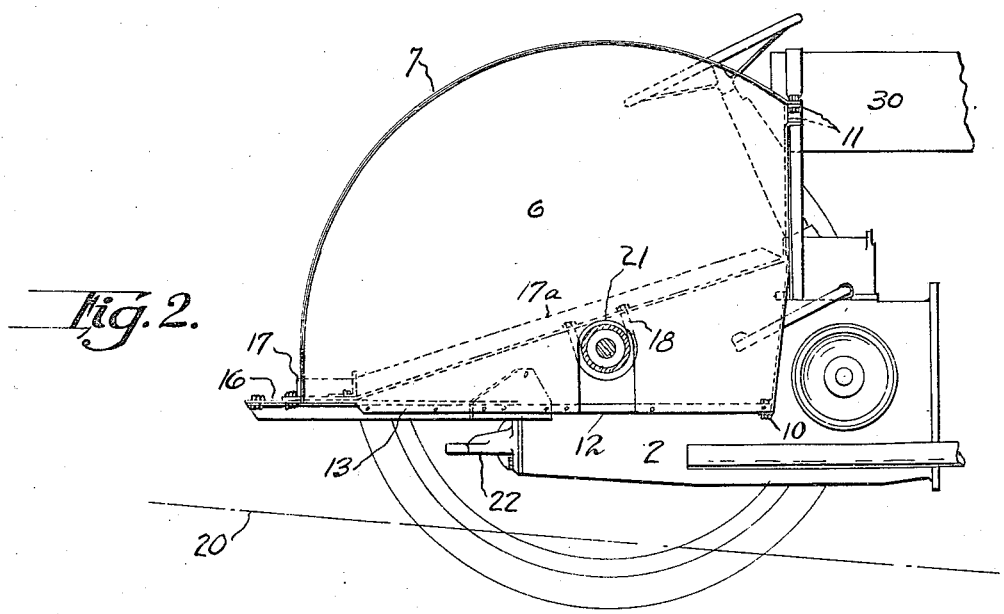
Fig. 2 is a side elevation thereof with one of the wheels removed to show the fender structure.
Figure 3:
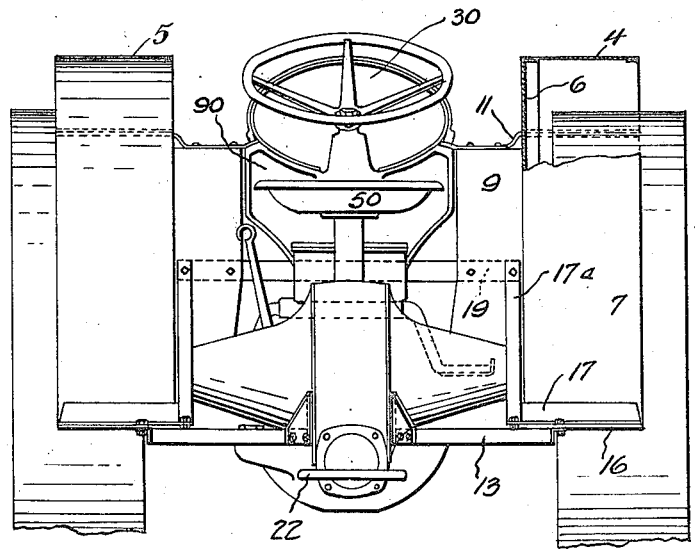
Fig. 3 is a rear elevation showing the fender structure and its relationship with the tractor body.
Figure 4:
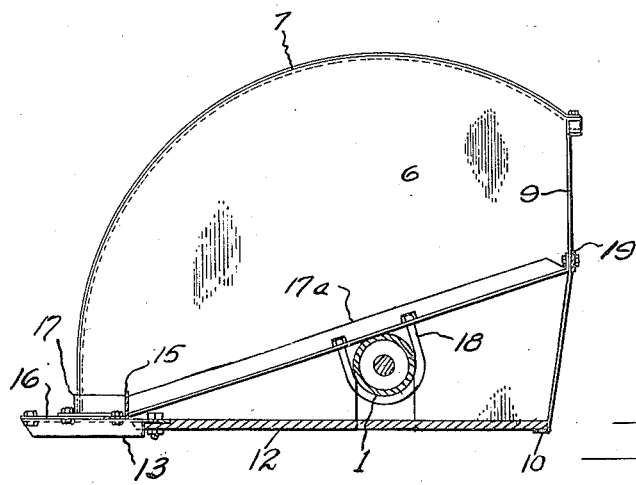
Fig. 4 is a vertical section taken on line 4—4 of Fig. 1 showing the inner side of the fender and the brace rod.

It is to be understood that this fender and safe guard may be employed with various types of vehicles and is here shown as connected with the standard type of what is known as the "Fordson" tractor. The forward part of the vehicle and the steering wheels is not here shown but the housing 1 for the driving axle is indicated and the longitudinal portion 2 of the main body of the tractor is shown. This portion 2 at the forward end is usually formed with a housing 3 adapted to be connected to the rear of the engine case (not here shown). This structure, however, varies with different types of vehicles but the same general principle of construction of fender and safe guard is applicable to the various types and is particularly useful with the type of vehicle in which there is a tendency for the vehicle to turn about the driving axle whenever the driving wheels become locked from rotation. These vehicles are usually unprovided with fenders and the driver occupying the seat 50 between the driving wheels is unshielded from the ground surface and becomes covered with the dirt and grime thrown inwardly from the driving wheels. To obviate this inconvenience I provide a fender for each wheel shown at 4 and 5 which has a flat portion indicated at 6 in Fig. 2 extending over the inner side of the wheel and at the upper edge this plate or shield 6 is provided with a curved outwardly extending flange 7 extending for a distance about the periphery of the wheel. In the structure here shown, the shield portion 6 of the fender is bent at a right angle and extends inwardly at the forward edge as indicated at 9 in Fig. 1 forming a vertical wall forward of the driver's seat and if desired the lower edge of this vertical wall is bent at substantially a right angle and extends toward the rear as indicated by dotted lines 10 in Fig. 1. The forward edge of the portion 7 and this inwardly extending vertical wall 9 each are secured to a bar 11 on each side extending transversely of the machine and supported adjacent the fuel tank 30 in the type of tractor as shown particularly in Figs. 2 and 3. Fig. 3 clearly shows this inwardly extending portion 9 of the fender plate and, on the rearwardly extending part 10 thereof, at the forward end is placed a floor member 12, there being a floor member on each side of the central portion 2 of the body which extends continuously beneath the housing 1 for the axle of the vehicle. When no flange 10 is provided the forward end of the foot board may be secured directly to the lower edge of the portion 9. This floor extends to the rear of the machine and is there supported by the brace bar 13, one of which is provided on each side of the machine and is secured to a bracket 14 attached to the vehicle body. These bars extend in a horizontal line and tend to retain the lower ends of the fenders in correct spaced relation. Preferably, I employ a detachable cross bar 15 extending between the two bars 13 near the rear end as will be understood from Fig. 1. At the lower end of the fenders I also provide a rearwardly extending plate 16 in each case normally extending in a horizontal plane and providing a step and supported partly by the bar 13 in each case. The lower end of each fender also has an angle iron bar 17 bent about the rear lower edge as shown in Figs. 1 and 2 and extends upwardly with a straight part 17ª at an angle from the lower bent end over the upper part of the axle housing 1 to which it is connected by means of a U bolt 18 and at the forward end is connected to the transversely extending bar 19 shown clearly in Figs. 2, 3 and 4. This bar is a stiffening member for the fender proper and provides a brace rod which may withstand considerable strain as hereinafter set forth.

There are two principal objects attained by a structure of the character described— namely, that above described whereby a housing is provided within which the operator may be seated and shielding the operator from the dirt and dust thrown up from below and inwardly by the wheels during operation of the device and further shielding the operator from injury from the wheels or other moving parts of the mechanism as well as providing a platform for the operator to use as a mounting step, as a floor, and as a convenient foot rest when the operator is seated and an additional principal feature which is to provide in a fender a structure that will prevent the turning of the machine upward about the driving axle to a dangerous angle. With machines of the type herein described many instances have been known in which the driving wheels become stalled and the power of the tractor turns the body about the driving axle tipping the machine over backwards and injuring or killing the operator and damaging the tractor. With this device, due to the outwardly extending step portion at the lower end of the fender and the several brace rods generally positioned as stated herein, particularly the bar 17, the turning of the vehicle about the axle brings the step member and rear end of the fender into contact with the surface of the ground and this fender end and step are positioned at such a height from the ground that it will come in contact with the ground before the tractor body has been turned upward to a dangerous angle as will be readily understood. The fact is the driving wheels in most cases will first dig into the ground a considerable distance as for instance would be understood by the dotted line 20 in Fig. 2 before the wheels will become stalled and this brings the step 16 and rear end of the fender quite near the ground. Therefore, the forward end of the vehicle will have raised a short distance only before the member 16 contacts the ground surface preventing a further turning of the vehicle as the resistance of the step member and adjacent connected parts to movement into the ground surface is so great as to stall the engine.

The U bolt 18 extends through a flange of the angular portion 17ª of the brace bar and preferably a groove 21 is provided in the end of the housing members 1 to receive this U bolt as will be understood from Fig. 2. The several parts of the fender member are therefore strongly braced and tied together providing a structure capable of resisting great strain without injury or displacement.

As heretofore stated I preferably use the detachable bar 15 extending between the two horizontal brace members 13 which in the structure here shown are positioned to the rear of the member 22. If the trailing device is to be connected directly to the member 22 this brace rod 15 may be removed.

With what is known as the "Fordson" tractor, the bar 11 extending from the front upper end of the fender and upper edge of the portion 9 may be connected adjacent to the fuel tank 30 extending above the transmission mechanism as shown in Figs. 2 and 3 and also as will be understood from Fig. 3 the bar 19 extends transversely of the machine and attached to a convenient portion thereof, as for instance the dash 90 of the tractor. However, it is to be understood that these bars 11 and 19 may be connected to any convenient stationary part of the vehicle to which this fender structure may be applied.

Having thus fully described my invention, what I claim is—

1. A fender or safe guard for automotive vehicles comprising the combination with the two driving wheels thereof, the driving axle and housing therefor extending between the wheels, of a fender for each wheel consisting of a sheet metal plate covering the inner side of each wheel from about the axle line upward and having an outwardly turned flange member at the top extending over the periphery of the respective wheel, a rearwardly extending member at the lower end of each fender providing a step, a brace rod extending from the rear end of each fender toward the center of the machine in substantially V shaped relation, and a brace rod extending from the rear of each fender toward the front thereof at an angle to the horizontal, the front end of each of said angularly positioned brace rods being secured in fixed relation with the tractor structure and intermediate the ends to the axle housing tending to resist strains imposed on the rear end of the fender.

2. A fender or safe guard for automotive vehicles comprising the combination with the two driving wheels thereof, the driving axle and housing therefor extending between the wheels, of a fender for each wheel consisting of a sheet metal plate covering the inner side of each wheel from about the line of the axle upward and having an outwardly turned flange member at the top extending over the periphery of each of the respective wheels, said plate also being provided at the forward end with an inwardly extending portion, a brace rod extending from the rear end of each fender toward the center of the machine, a horizontal floor member on each side of the machine supported by the plate and by the said brace member on the respective sides, and a second brace rod for each fender extending from the rear end thereof toward the front at an angle to the horizontal, said bar being secured intermediate its ends to the axle housing and secured in fixed relation at the forward end with the tractor structure.

3. A fender and safe guard for automotive vehicles comprising the combination with the two drive wheels thereof, the driving axle and housing therefor and body extending between the wheels, of a fender for each wheel consisting of a sheet metal member extending upwardly over the inner face of the wheel, the upper edge of the sheet being outwardly turned providing a fender covering a portion of the periphery of the wheel, the forward edge of the said shield being inwardly bent at about a right angle to the body thereof extending practically to the vehicle structure, a bar or brace extending from the front edge of the said upper flange portion across the inwardly bent forward end and secured to the vehicle structure, the lower rear edge of the said fender portion being provided with a rearwardly extending portion providing a step, a brace rod extending from each rearwardly extending portion of each fender toward and attached to the body of the vehicle in substantially a V shaped relation, a horizontal floor member supported at the lower edge of each shield member and the respective brace rod at the rear, the said shield and inwardly bent forward portion thereof and foot board on each side providing a housing within which the operator may be positioned, and an angularly positioned brace rod for each fender extending from the lower rear edge thereof upwardly at an angle to the horizontal across the upper side of the axle housing at each end, means for attaching the bar to the said housing, and a cross bar secured to the vehicle structure at the center and to the forward ends of the said angular brace rods, the said rearwardly extending portion of the fenders providing a step and a ground contact member limiting the extent to which the vehicle may be turned about the driving axle.

In testimony whereof, I sign this specification.

HOWARD W. SIMPSON.